Figure 3:
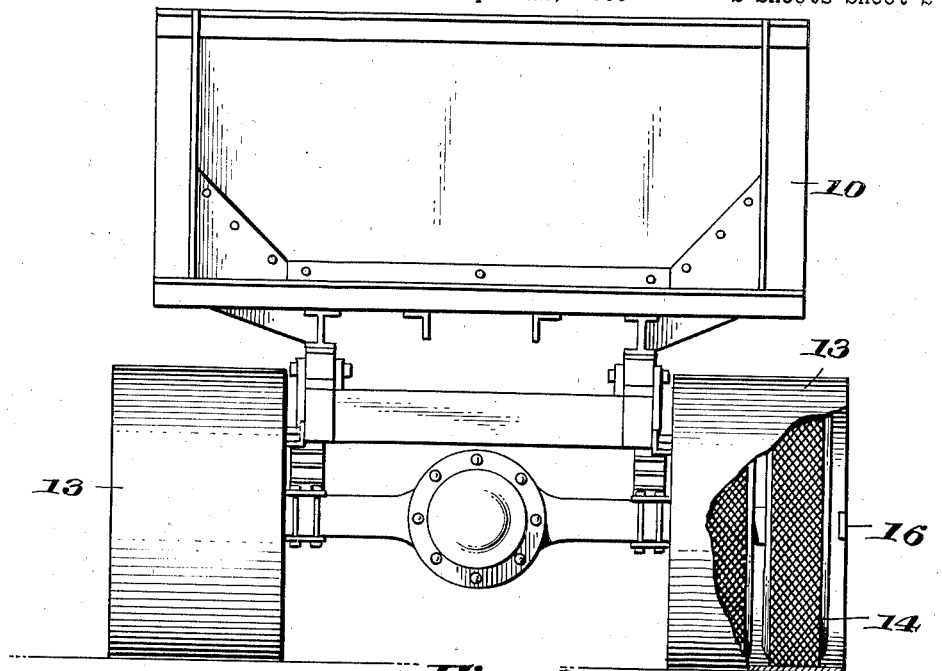

March 25, 1941. W. B. WHITFIELD 2,235,953
APPARATUS FOR APPLYING ROAD ROLLERS TO CONVERTIBLE VEHICLES
Filed Sept. 22, 1939 2 Sheets-Sheet 1
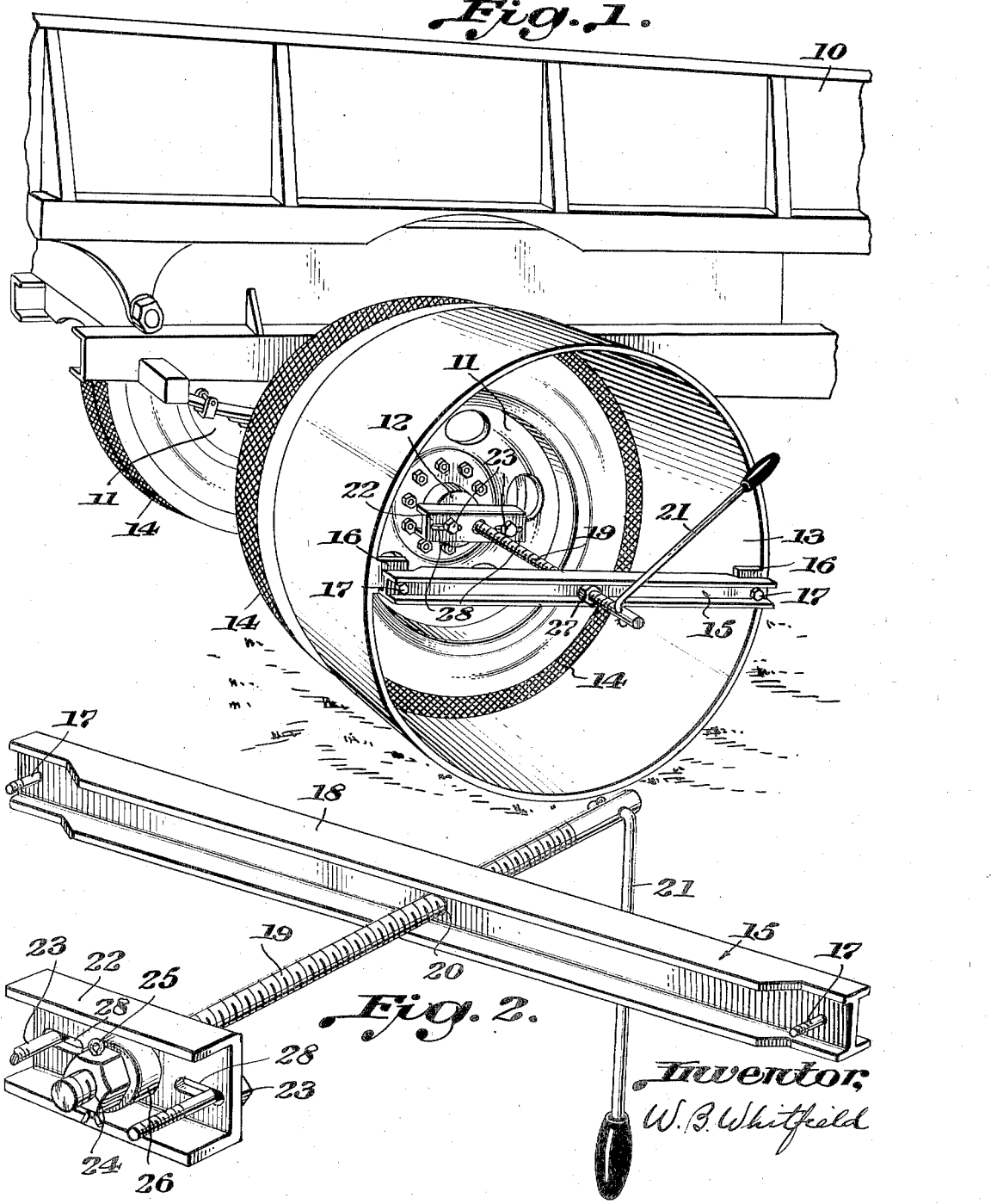
Inventor,
W. B. Whitfield
By Myatt Dowell
Atty.

March 25, 1941.   W. B. WHITFIELD   2,235,953
APPARATUS FOR APPLYING ROAD ROLLERS TO CONVERTIBLE VEHICLES
Filed Sept. 22, 1939   2 Sheets-Sheet 2

Inventor,
W. B. Whitfield
By A. Yates Dowell Atty.

Patented Mar. 25, 1941

2,235,953

UNITED STATES PATENT OFFICE 2,235,953

APPARATUS FOR APPLYING ROAD ROLLERS TO CONVERTIBLE VEHICLES

William Bruce Whitfield, Huntsville, Ala.

Application September 22, 1939, Serial No. 296,149

4 Claims. (Cl. 94—50)

This invention relates to wheeled vehicles. It is particularly directed to a novel means for providing a convertible wheeled vehicle that is readily adaptable for use either as a normal vehicle or as a surface rolling machine.

In prior vehicles heavy annular rollers have been applied over pneumatic tires, but it has been troublesome or impossible to keep these rollers in place for any length of time when in actual use. Furthermore, no effective means has ever been suggested for quickly applying or removing these rollers.

Therefore a primary object of this invention is to provide a vehicle, such as a motor truck, that is quickly available for use either as a vehicle or as a reliable surface rolling machine. A further object is to provide a novel means for securely and rapidly applying an annular roller to the perifery of a motor truck tire. Another object is to provide a novel means for rapidly removing such a roller from such a tire.

Equally important objects will more plainly appear from the detailed specification and drawings presented herewith in exemplification but not in limitation of the present invention.

Like reference characters designate like parts in the drawings which represent diagrammatically in—

Figure 4:
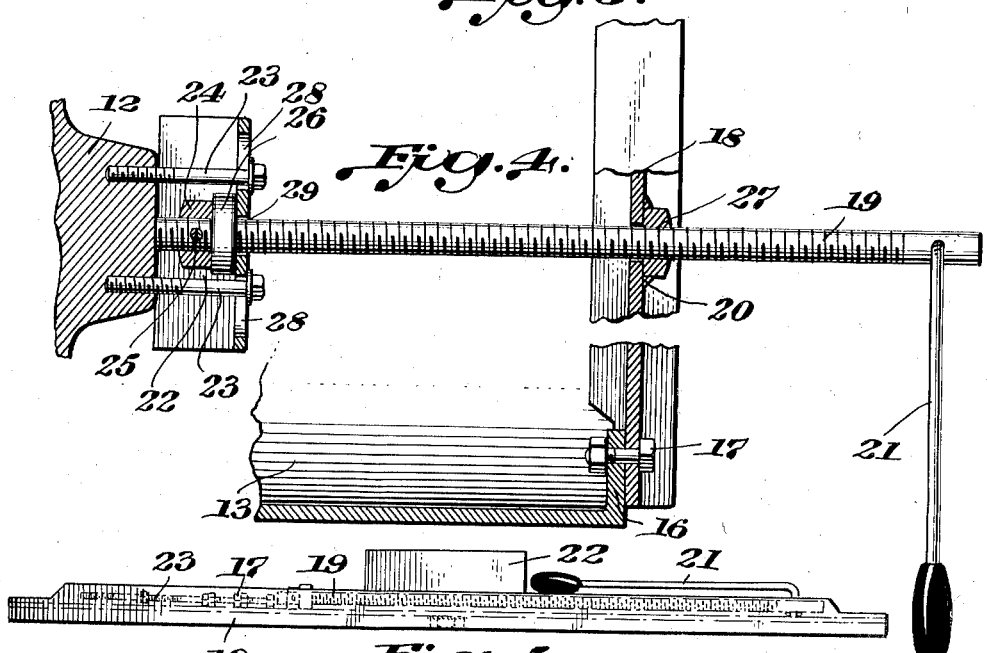
Figure 5:
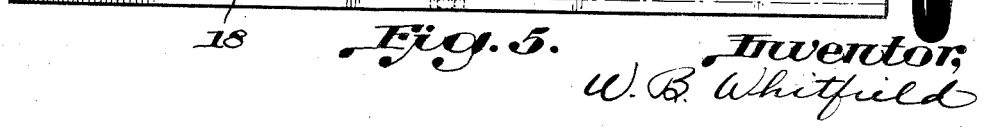

Fig. 1 a fragmentary perspective view of the rear portion of a motor truck showing a road roller partially applied to the rear wheel;

Fig. 2 a perspective view of my novel appliance in assembled position before being attached to the roller and to the wheel;

Fig. 3 a rear elevation of a motor truck with rollers applied to both rear twin tired wheels, including a cutaway view of one of the rollers in its applied position;

Fig. 4 a fragmentary vertical cross-sectional view of the appliance in a preferred operative position, attached to the wheel hub and to the roller, for applying or removing the roller; and Fig. 5 shows a side elevation of the appliance when disassembled and packed within itself for shipping, or storage.

In Fig. 1, is shown a motor truck 10, having rear twin wheels 11, with the usual hubs 12. A relatively heavy metal annular roller 13, is shown partially applied in contact with the tread of the outside tire 14. The roller 13 is preferably provided on its outer periphery with inwardly projecting lugs 16 to which the bridge member 18 of the appliance 15, is attached by means such as bolts 17. The inside of the inner periphery of the roller 13 is preferably beveled to aid its engagement with the tire 14.

The appliance 15 may preferably be made of wrought iron or steel or the like and as shown in its assembled position in Fig. 2 comprises a bridge member 18 and a threaded shaft 19 coacting with a threaded cylindrical opening such as a tapped hole 20 in the center of the bridge 18. The aperture 20 may be reinforced by a threaded nut 27 fixed or welded to the bridge 18 as shown in Fig. 4. The ends of the bridge 18 are provided with treaded bolts 17 adapted to engage the lugs 16 of the roller 13. The outer end of the shaft 19 may be provided with a lever 21 swingably attached thereto. To the lower end of the shaft 19 is applied a hub-engaging base member 22 with bolts 23 adapted to engage the hub 12. The bolts 23 are adjustably positioned in the base member 22 by means of the slots 28. The base member 22 is loosely placed on the end of the shaft 19 by means of the aperture 29 and the nut 24 secured thereon by attaching means such as a cotter pin 25. A roller thrust bearing 26 is preferably interposed between the nut 24 and the hub-engaging member 22 to permit free rotation of the nut 24 when it is in operative position in contact with the bearing 26 which in turn is in contact with the under side of the hub member 22.

Under certain surface conditions it is possible with my improved method and means to apply the roller 13 without first elevating the truck 10. However, it is usually preferred to first jack up the rear wheel 11 so that the tires 14 are just clear of the road surface. The tires 14 are then preferably partially deflated so that they may be flexed into approximately the same position they would assume when fully loaded. For example, the usual pressure of a heavy duty truck tire is 90 pounds, and such tires should be deflated to approximately 40 pounds pressure. The inner periphery of the roller 13 is next engaged with the outer periphery of the outer twin tire 14 as shown in Fig. 1. The cap screws or bolts usually found in the hub 12 of the usual motor truck may be then removed. The base member 22 may be next attached to the hub 12 by means of the bolts 23. In some cases where old model motor trucks are to be used it may be necessary to attach the bolts 23 to the hub 12 or to the wheels 11 by any of the well known forms of couplings or adapters. The appliance 15 is then fixed to the roller 13 by attaching the bridge member 18 to the lugs 16 by means of the bolts 17.

The appliance 15 is now in its attached position and may preferably be operated as follows:

With lever 21 the operator may now rotate the shaft 19 which by means of its threaded engagement with the bridge member 18 at the nut 27 will inwardly force the roller 13 into gripping engagement with the outer edge of the tire 14. The operator may next hold or secure the lever 21 in a stationary position and have the power of the truck motor in forward gear applied to the wheel 11 so that it will at first slowly rotate. Inasmuch as the roller 13 has been pressed into gripping engagement with the tire 14, it will rotate therewith, and inasmuch as the lever 21 is held in a fixed position, the shaft 19 will be prevented from rotating and the bridge member 18 which is now rotating with the roller 13 will thus be forced to travel down the shaft 19 the desired distance and thereby quickly press the roller 13 into complete engagement with the tires 14 as shown in Fig. 3. If it is preferred not to use the motor, the operator may continue to rotate the shaft 19 by means of the lever 21 and this will cause the bridge 18 to travel down the shaft 19 by means of its threaded engagement therewith shown at 27 in Fig. 4. The operator may continue this operation until the roller 13 has completely engaged the tires 14 as shown in Fig. 3. Next the tires may be reinflated to their normal pressure and the supporting jack and the appliance removed and the truck will then be ready for use as a road roller.

The removal of the roller 13 by means of the appliance 15 is preferably as follows:

The wheel 11 may be jacked up so that the tire 14 is clear of the road by approximately one inch. The base 22 of the appliance 15 may be next attached to the hub 12 by means of the bolts 23. The bridge 18 may next be attached to the lugs 16 of the roller 13 by means of the bolts 17. The operator may next hold or secure the lever 21, and with the truck motor in reverse gear apply its power to wheel 11. The consequent rotation of the wheel 11 and the roller 13 will cause the roller 13 with the bridge 18 to travel outwardly along the shaft 19 until the roller 13 is disengaged from the tire 14. The motor may then be stopped and the appliance 15 detached from the hub 12. If it is desired not to use the motor of the truck, the roller 13 may be readily applied or removed by manually rotating the shaft 19 by means of the lever 21.

When not in use the appliance 15 may be packed as shown in Figure 5. The cotter pin 25 may be withdrawn, the nut 24 then unscrewed, and the bearing 26, and the base 22 removed and the bridge 18 unscrewed from the shaft 19. These parts may then be arranged within the bridge 18 as shown in Figure 5, and packed for storage in the truck or elsewhere until again needed.

It is preferred to provide the roller 13 in two sizes for all standard heavy duty truck tires, one size for new treads and an additional size for worn-down treads. In cases where extremely worn-out treads are encountered, a shorter shaft may be substituted for the shaft 19 after the roller 13 has been applied. The appliance 15 may then be re-attached and left in position while the roller is in use. It is apparent that this use of the appliance 15 need only occur in emergency cases where very bad tires are inescapable.

Depending on the condition of the tire treads, it is preferred to make the inside diameter of the roller 13 at least one-half to one inch less than the outside diameter of the new or worn tread or the tire 14, when it is partially deflated or when it is under a full load, as previously explained. This will insure a positive grip before, as well as after the tire is reinflated. In the prior art this positive grip could not be attained even after reinflation for two reasons; first, if the diameter of prior rollers had been made small enough it would have been consequently impossible to force the roller over the tire by any prior means, and second, when the diameter of the roller was actually made large enough to enable it to be forced over the tire by prior means, it could not remain in place when in actual use without the aid of additional attaching means. The prior art was unaware of, or completely ignored the fact that modern heavy duty truck tires decrease inappreciably in rigidity and diameter when deflated. Therefore no roller in actual usage can possibly remain in place on such a tire unless the roller, as first taught herein, has a sufficiently reduced diameter and is applied to the tire by sufficient pressure.

The present invention is the first to provide a rapid and efficient means for supplying such a reduced diameter roller with this sufficient pressure, and is thereby the first to permit the rapid conversion and reconversion of motor truck to surface roller as herein described.

What is claimed is:

1. Apparatus for forcing a non-resilient annulus into or out of compressive encircling engagement with a resilient tread of a vehicle supporting wheel when said wheel is in operative connection with said vehicle, said apparatus comprising in combination, bridge means adapted to be secured across the outer rim of said annulus, threaded means in rotatable threaded engagement with said bridge means, and securing means adapted to hold said threaded means in freely rotatable engagement with said wheel, whereby said annulus may be selectively withdrawn from or forced over said tread by counter-rotation between said wheel and said threaded means and by the resulting travel of said bridge means along said threaded means.

2. The combination of claim 1, wherein said threaded means includes lever means secured to the outer end thereof whereby said threaded means may be manually rotated, or held against rotation.

3. The combination of claim 1, wherein the outer rim of said annulus is provided with opposed inwardly projecting flanges to which said bridge means is detachably secured.

4. The combination of claim 1, wherein said securing means comprises a channel member provided with opposed elongated slots and coacting engaging means extending through said slots whereby said securing means may be detachably and adjustably secured to said wheel.

WILLIAM BRUCE WHITFIELD.